E. E. SCOTT.
Butter-Workers.
No. 143,260. Patented September 30, 1873.
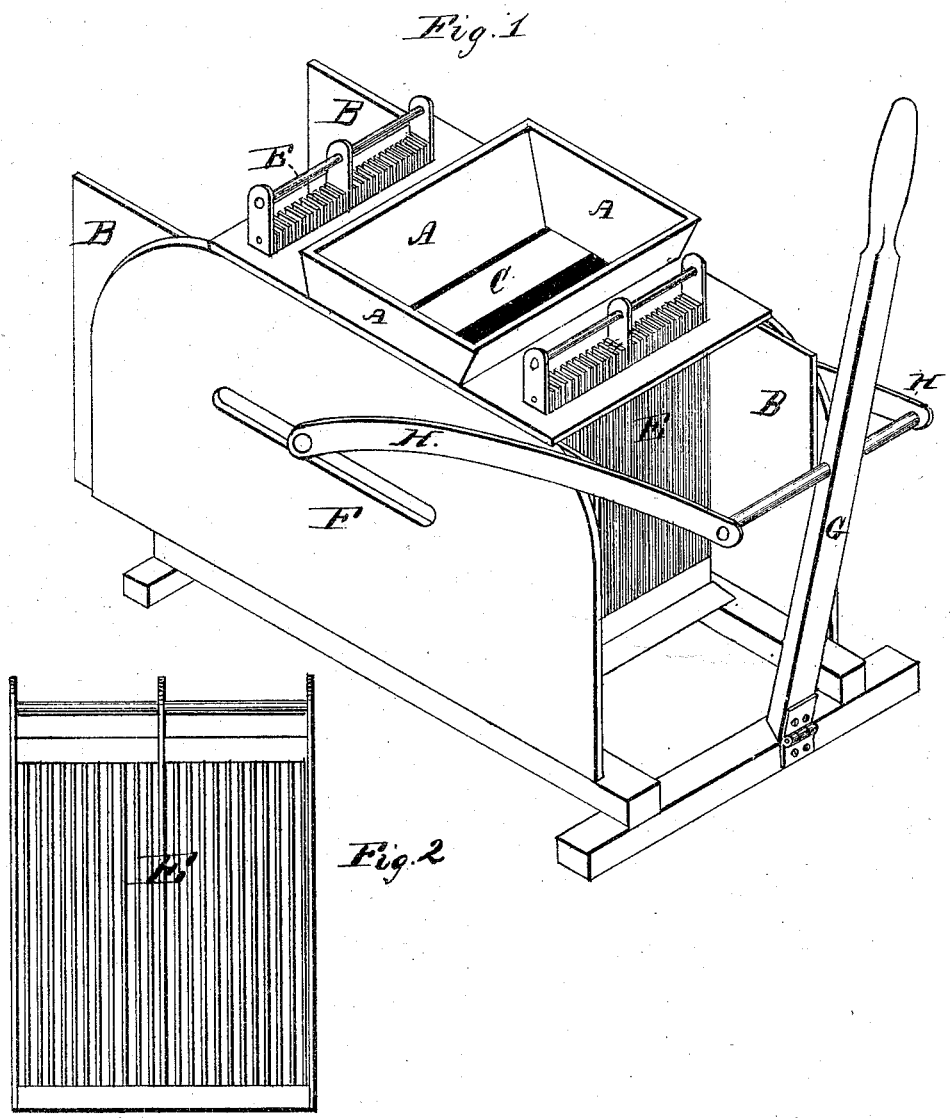

UNITED STATES PATENT OFFICE.

EDMUND E. SCOTT, OF BELOIT, WISCONSIN, ASSIGNOR OF TWO-THIRDS HIS RIGHT TO G. E. SMITH AND JESSE WILSON, OF SAME PLACE.

IMPROVEMENT IN BUTTER-WORKERS.

Specification forming part of Letters Patent No. 143,260, dated September 30, 1873; application filed June 6, 1873.

*To all whom it may concern:*

Be it known that I, EDMUND E. SCOTT, of the city of Beloit, in the county of Rock and State of Wisconsin, have invented certain new and useful Improvements in Butter-Workers; and I do hereby declare the following to be a full, clear, and exact description of the invention, such as will enable others skilled in the art to which it pertains to make and use it, reference being had to the accompanying drawings, which forms part of this specification, and in which—

Figure 1 represents a perspective view of my improved worker complete, and Fig. 2 a separate view of one of the detachable butter-shredding grates, partly shown in Fig. 1.

Like letters of reference indicate corresponding parts.

My invention relates to that class of devices which are designed for working and reworking butter. It is seldom the different churnings will produce butter in all respects alike, or of uniform color, hardness, and flavor. The object of my invention is to facilitate working and reworking butter either in large or small quantities; and to that end it consists in the means employed for that purpose, hereinafter fully set forth.

In the drawing, A represents the hopper for the reception of the butter to be worked; B, the sliding butter-shredding chamber, divided by the double-acting follower-block C, forming a part of the sliding frame B. E E are vertical shredding-grates across, and entirely inclosing, the outer ends of the shredding-chamber B. F represents the outer shell or frame of the device, to which the hopper A is rigidly affixed. A vertical lever, G, actuates the shredding box or chamber B by means of the oscillating arms H, as shown.

The shredding-grates E E are detachable, and may thereby the more easily be cleaned after, or preparatory to, use; and by this feature of my invention grates of varying width of fineness in meshes may be employed, if found advantageous to the better working of the butter, being handled to suit the varying conditions of butter—hard or soft.

This butter-working apparatus may be placed upon and secured to any suitable vat, box, or tub.

In order to pass the butter through the grates E E the butter is first placed in the hopper in suitable quantities. The lever G is then forced forward or back, as its position at the time may require, so that the pressure of the follower-block will force the butter through the shredding-grates horizontally into any suitable receptacle. By this means the butter is thoroughly shredded, and as it passes into the vat the shreds mingle with each other, and thus facilitate the process of working and reworking.

Having thus described my invention, what I claim as new, and desire to secure by Letters Patent, is—

In a butter-worker, the combination and arrangement of the grates E E, the sliding double-acting frame or chamber B, divided by the follower-block C, and actuated by the vertical lever G, and oscillating arms H, outer frame or shell F, and hopper A, substantially as set forth.

In testimony that I claim the foregoing I have hereunto set my hand this 2d day of June, 1873.

EDMUND E. SCOTT.

Witnesses:
   I. E. GOODELL,
   GIRDER E. SMITH.